March 30, 1937.　　　C. P. TROTTER　　　2,075,483
DRILL STEM COUPLING
Filed May 8, 1936　　　2 Sheets-Sheet 1
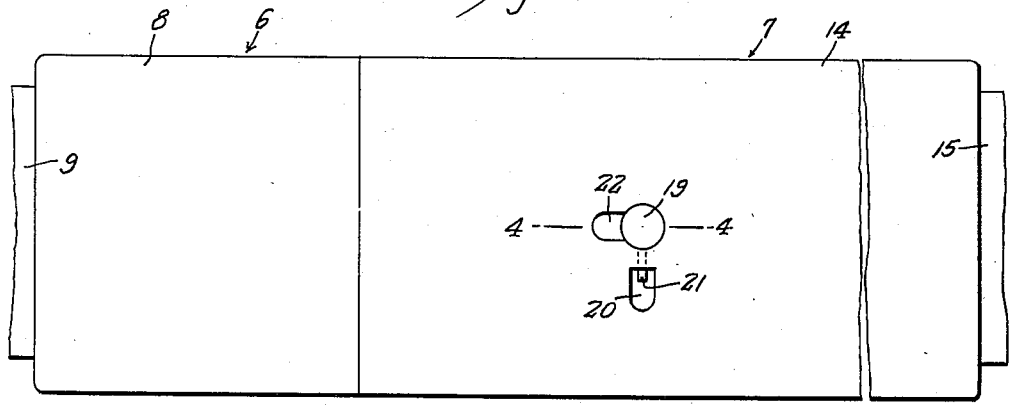
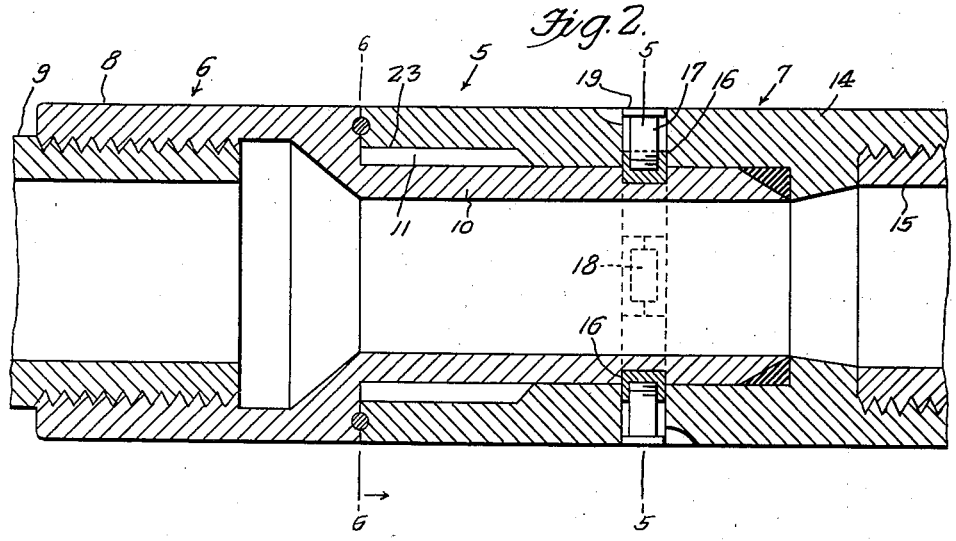
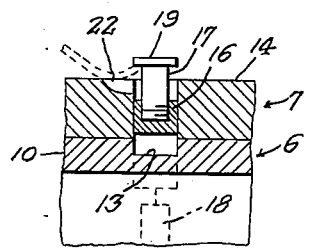
Inventor
Cody P. Trotter,
By Clarence A. O'Brien and
Hyman Berman
Attorneys March 30, 1937.  C. P. TROTTER  2,075,483
DRILL STEM COUPLING
Filed May 8, 1936  2 Sheets-Sheet 2

Inventor
Cody P. Trotter.

By Clarence A. O'Brien and
Hyman Berman
Attorneys

Patented Mar. 30, 1937

2,075,483

UNITED STATES PATENT OFFICE 2,075,483

DRILL STEM COUPLING

Cody P. Trotter, Golden Meadow, La.

Application May 8, 1936, Serial No. 78,696

1 Claim. (Cl. 285—169)

This invention appertains to new and useful improvements in couplings for drill stems and more particularly to a coupling of this character having certain automatic features.

The principal object of the present invention is to provide a coupling of the character stated which can very easily be connected and disconnected and which is contemplated to save time and eliminate the use of tongs.

During the course of the following specification various important objects and advantages of the invention will become apparent to the reader.

In the drawings:—

Figure 1 represents a side elevational view of the coupling.

Figure 2 represents a longitudinal sectional view through the coupling.

Figure 4 is a sectional view on the line 4—4 of Figure 1.

Figure 6:
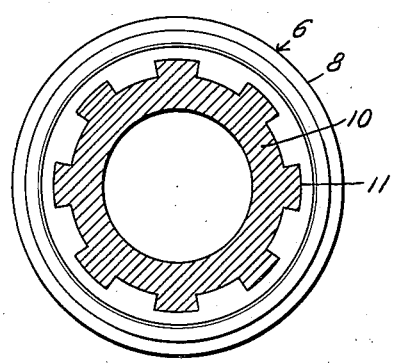
Figure 6 is a cross sectional view on the line 6—6 of Figure 7.

Referring to the drawings wherein line numerals designate like parts, it can be seen that the coupling is generally referred to by numeral 5, the male unit generally referred to by numeral 6, and the female unit generally referred to by numeral 7. The male unit 6 is provided with the head portion 8 integrally threaded for receiving the stem section 9. This head 8 is provided with the reduced cylindrical extension 10 which is provided with splines or ribs 11 extending from the head and terminating about midway of its length. The free end of the reduced extension 10 is beveled off as at 12 and just inwardly of this is located the circumferentially extending channel 13.

Figure 5:
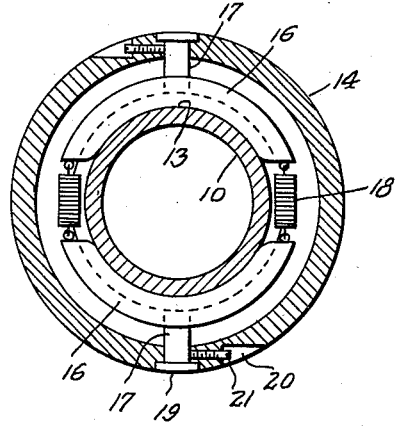
Figure 5 is a section on the line 5—5 of Figure 2.
Figure 7:
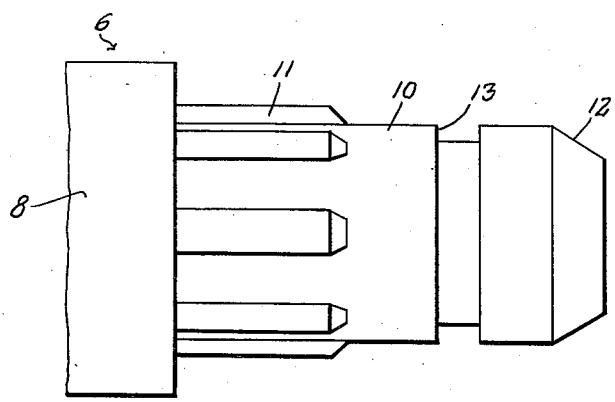
Figure 7 is a fragmentary side elevational view of the male element of the coupling.
Figure 3:
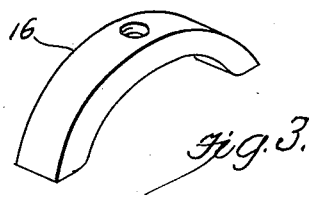
Figure 3 is a perspective view of one of the arcuate detents.

The female unit 7 consists of the cylindrical shell 14 having one end internally threaded to receive the corresponding stem section 15. As is clearly shown in Figure 5, the female unit 7 has a pair of internal arcuate-shaped members 16—16 and each of these has a pin 17 extending through a corresponding opening in the shell 14. Adjacent ends of these arcuate-shaped members 16 which are in fact detents are connected together by extensible coiled springs 18. (See Figure 5.)

The other ends of the pins 17 are provided with heads 19 and the shell 14 is notched as at 20 adjacent each of the pins 17 so that a set screw 21 can be operated toward and against the corresponding pin 17 to retain the same in a fixed position.

Adjacent each of the heads 19, the shell 14 is provided with a small notch 22 to permit a suitable instrument to be inserted under the head 19 to facilitate displacement of the arcuate-shaped member 16 from the groove 13 of the male unit 6. Obviously with the male and female units connected together and locked in the manner shown in Figure 2, there are no projecting parts to cause trouble. Furthermore, the coupling can be easily disconnected and the coupling is entirely rigid in view of the grooves 23 in the shell 14 receiving the ribs 11 on the male unit 8.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:—

A drill stem coupling comprising a male unit, a female unit adapted to receive the male unit, said female unit including a shell, said male unit including an extension for disposition in the shell, said extension being provided with a circumferential channel, and a pair of arcuate-shaped detent members in the shell engaged into the channel, springs connecting the ends of the arcuate-shaped members for retaining the same in the channel, headed pins extending from the arcuate-shaped members through openings in the shell to provide means for retracting the arcuate shaped members from the channel, and means operable from the outside of the shell and engaging the pins for securing the same against movement.

CODY P. TROTTER.